Feb. 3, 1970 A. J. KOLK, JR 3,493,944

NDRO AND ASSOCIATIVE MEMORY

Original Filed June 16, 1964 2 Sheets-Sheet 1

INVENTOR:
Anthony J. Kolk, Jr.

By Frederic P. Smith
Attorney

NDRO AND ASSOCIATIVE MEMORY

INVENTOR:
Anthony J. Kolk, Jr.

By Frederic P. Smith
Attorney

United States Patent Office 3,493,944
Patented Feb. 3, 1970

3,493,944

NDRO AND ASSOCIATIVE MEMORY

Anthony J. Kolk, Jr., Rolling Hills, Calif., assignor to Litton Systems, Inc., Woodland Hills, Calif.

Continuation of application Ser. No. 375,575, June 16, 1964. This application Jan. 2, 1969, Ser. No. 791,858
Int. Cl. G11b 5/62
U.S. Cl. 340—174 9 Claims

ABSTRACT OF THE DISCLOSURE

A magnetic memory element which comprises two or more hollow cylinder-like structures of magnetic material having closed circumferential flux paths therein and having the top and bottom edges joined, respectively, by magnetic material to form a closed flux path angularly oriented to the circumferential flux paths. A bias circuit is so coupled to the memory element as to apply a magnetic field to the angularly oriented flux path. A write circuit for setting the flux orientation into either a first or a second circumferential remanent magnetic state is coupled to the circumferential flux paths; an interrogation circuit is provided for temporarily applying a magnetic field in a selected one of the circumferential directions; and a sensing circuit is coupled to the angularly oriented flux path for sensing a change in flux during the application of the interrogation field.

This is a continuation of U.S. patent application Ser. No. 375,575, filed June 16, 1964 now abandoned.

This invention relates in general to magnetic storage or memory arrays and in particular to new and improved plated magnetic memory elements and the techniques and methods of construction thereof.

Great emphasis has recently been placed on the design and construction of storage or memory arrays for use in high speed computers. Because of the myriad of uses to which the computers have been placed, various considerations have dictated the type of memory elements to be used. As it has been found that computers function most accurately when the information is in the form of a zero or a one, that is when there is either a signal or no signal, various bistable elements have logically found favor as suitable for storage elements; there are elements which exist in one of two stable states and can be switched from one state to the other by the application of a voltage or a magnetic field. Among some of the requirements for these storage elements are low drive or power consumption, high switching speed, high information or bit density, low cost per element, uniformity and reliability, strength of the output signal, and good heat transfer to prevent a degradation in the quality of the output signal. One of the most widely used elements is the ferrite core composed of a powdered, compressed, and sintered magnetic material having high resistivity and consisting chiefly of ferric oxide combined with one or more other metal oxides. While ferrite cores have low drive and power consumption and produce sufficiently strong output signals, they are limited in their switching speed and their high temperature operation (due to poor heat transfer). Since they are individually molded, there are wide variations in uniformity; in addition, since they must be assembled into memory planes and individually wired, they have a low bit density and high bit cost in the fabricated memory. Although some of the wiring problems have been alleviated by placing the ferrite cores into holes in a substrate and using printed wiring over the substrate and through the holes, the basic disadvantages of individual molding and assembly still remain.

Since ferrite cores have these limitations, investigations have been made in evaporated and plated magnetic thin films. These films may be constructed with an easy direction of magnetization along which the magnetization vectors of the film tend to align to bring the energy of the film to its lowest state; such a magnetic film is called anisotropic and the excess energy required to align the magnetization vectors in the hard direction of magnetization, that is the direction orthogonal to the easy direction of magnetization, is called the anisotropy energy. Since an anisotropic magnetic film may be very quickly switched by utilizing a magnetic field which is antiparallel to the direction of magnetization of the film coupled with a magnetic field directed along the hard direction of magnetization, that is an orthogonal magnetic field, to rotate the magnetization vectors 180° in the plane of the film (called rotational switching), these films are inherently high speed devices. Because of their thinness and the mass application techniques utilized, they are potentially capable of providing high bit density and low bit cost accompanied by inherent uniformity. Since, however, magnetic poles have not been found to exist individually but only in pairs of opposite polarity, any magnetic field generated by a magnetic material must close back upon itself; this is usually accomplished, as in the case of a magnet, by the magnetic path going through the magnetic material and across the pole gaps of the magnet to form a closed flux path. In the case of a uniformly aligned magnetic thin film, the magnetic path goes through the film, out from one edge and across the surface of the film (externally), and back in the other edge; this external magnetic field is termed the demagnetizing field of the magnetic film. Since this demagnetizing field is antiparallel to the magnetization of the film, it tries to reverse the magnetization vectors of the film itself resulting in a decrease of threshold or slowing of the hysteresis loop of the magnetic film; because of this decrease in threshold the magnetization vectors do not rapidly switch at a predetermined magnetic field, and a lower signal output is obtained accompanied by a high amount of noise. If the memory array is composed of a matrix of magnetic dots on a planar substrate, the tendency exists for a large amount of cross-talk due to the magnetic interaction between spots caused by the open flux path and the external magnetic field. If the magnetic memory consists of a thin film having regions of oppositely directed magnetization therein the boundaries (domain walls) between the oppositely oriented regions (magnetic domains) are subject to creep and walking because of the tendency of the boundaries to move to a position where the magnetic energy of the film is in its lowest state, the high energy condition existing because of the open flux nature of the magnetic film. In addition, the magnetic film has a low signal output due both to the small amount of magnetic material involved and the poor flux coupling of the magnetic film with a sense line. While some of these problems have been solved to a limited degree by the use of a pair of magnetic films to partially close the open flux path or by forming "holes" with closed flux paths in a planar substrate by the molding and plating of an orthogonal matrix of plastic cylinders whose axes of revolution lie in the plane of the substrate, other problems have arisen. Some of these are the lowering of bit density, proper placement of individual holes in a hole pattern, proper registration of two dot-type memory planes, and fabrication of substrates suitable for the deposition of magnetic material with desired characteristics, since the techniques of molding, punching, or drilling of holes have not provided sufficient control of size, uniformity, or surface characteristics.

It is therefore the primary object of the present invention to provide an improved magnetic memory array along with a method of construction thereof suitable for use with micro-electronic and integrated semiconductor circuitry.

It is another object of the invention to describe a new and improved magnetic memory element having a closed flux path and capable of being mass fabricated with low bit cost and high uniformity.

It is a further object of the invention to provide an improved magnetic memory array having high bit density and low power consumption.

It is still another object of the invention to introduce magnetic memory elements suitable for use in data processing systems having fast switching speeds, good heat transfer, and capable of providing strong output signals.

Generally speaking, in this invention a matrix of holes having smooth walls is formed in a preselected substrate. The entire substrate and, in particular, the walls of the holes are then successively plated with one or more layers of an electrically conductive material and a layer of magnetic material. Portions of the layers are then selectively removed to leave a matrix of plated magnetic toroids; these toroids may be isolated, or selectively joined by magnetic material. One or more layers of insulated conducting leads are then plated across the substrate and through the plated magnetic toroids to form intimately coupled write, interrogate, and sensing patterns.

The invention and its objects, together with further features and advantages thereof, will become more apparent with reference to the following description and the accompanying drawings in which.

Figures 1, 2:
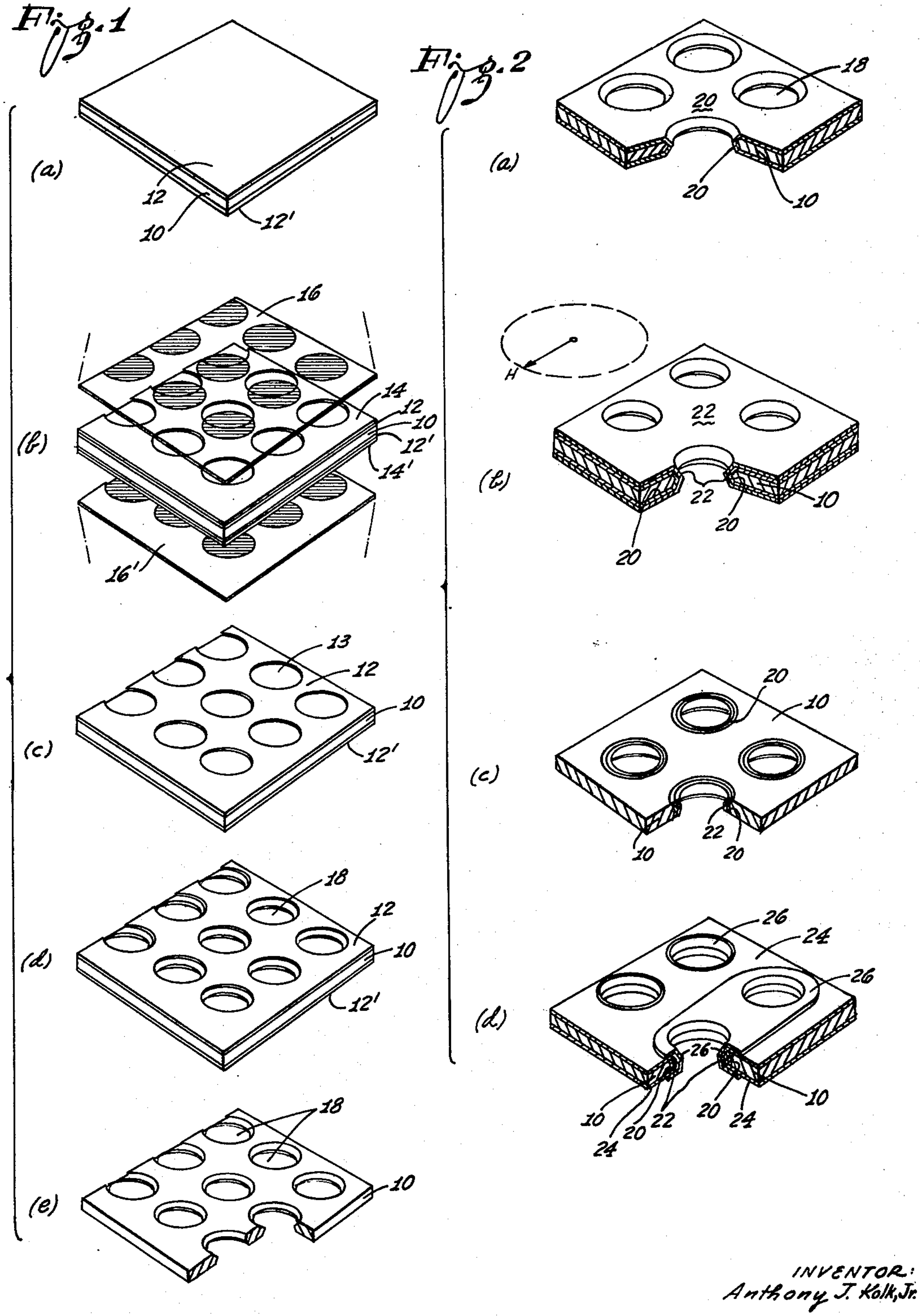
FIGURES 1(*a–e*) illustrate a preferred method of preparing a non-conductive substrate.
FIGURES 2(*a–d*) illustrate a preferred embodiment of the invention and the method of construction thereof.

In reference to FIGURES 1(*a–e*), a substrate 10 is shown in FIGURE 1(*a*) clad with layers 12 and 12' on each side. The substrate 10 may consist of a conductive material (such as copper or aluminum), a non-conductive material (such as glass, ceramic, plastic, epoxy-glass) or a material having a non-conductive surface (such as hard anodized aluminum or porcelainized soft iron), the choice thereof being determined by the strength of the material, its cost and, in this preferred embodiment, its ability to be photochemically drilled as described hereafter. For the purpose of this description only and not as a limitation on the invention, substrate 10 shall be assumed to be non-conductive, a non-conductive substrate being defined as one being non-conductive throughout or having a non-conductive surface. Although, in this embodiment, the substrate 10 has holes photochemically drilled in it, this technique should not be considered the sole one for the purpose of this invention. Any technique which forms a surface that is smooth enough so that the magnetic characteristics of a magnetic material which is plated thereon, as described more fully hereafter, are independent of the surface structure of the substrate 10 is sufficient for purposes of this invention. For example, the holes may be molded, punched, or drilled through the substrate 10, and then an additional layer of a material having a glassy surface, such as epoxy resin in the case of an epoxy-glass substrate, may be placed over the substrate 10 and on the walls of the holes formed therethrough to provide a smoother base on which to plate the magnetic material.

As illustrated in FIGURE 1(*b*), the layers 12 and 12' are covered with a standard photo-resist material 14 and 14', such as Kodak photo-resist, made by Eastman Kodak Company, which when exposed to ultraviolet light through a mask becomes selectively insoluble. The photo-resist material 14 and 14' is then exposed to ultraviolet light through mask 16 and 16' to form a precisely aligned front and back hole pattern on the photo-resist material 14 and 14', which material is subsequently developed and removed leaving an exposed hole pattern on the layers 12 and 12'. The exposed areas of the layers 12 and 12' are chemically removed using, in the case of a copper layer, a forced fine-mist spray of ferric chloride as an etchant to form uniform round holes in the layers 12 and 12'; in addition, the substrate 10 may be mounted on a rotary turntable so that any undercutting action of the etchant is carefully controlled due to the uniform distribution of the etchant. The layers 12 and 12' may be composed of any material which is impervious to any chemical etch which may be used on substrate 10, but which itself can be etched by the standard photo-resist techniques described above; it should be noted that if the photo-resist material itself is impervious to the chemical etch used on the substrate 10, as in the case of Kodak photo-resist placed on a copper substrate, the photo-resist material 14 and 14' may be substituted for the layers 12 and 12' and the initial etching step eliminated. FIGURE 1(*c*) shows the substrate 10 subsequently exposed on both sides through the carefully controlled hole pattern 13. The substrate 10 is then subjected to a suitable etchant, such as a mixture of hydrofluoric and concentrated sulphuric acid in the case of epoxy-glass, and a hole pattern 18 is etched through the substrate 10, as shown in FIGURE 1(*d*). It should be noted that the hole pattern 18 may be obtained, at the expense of larger holes, by etching through only one of the layers 12 and 12' and keeping the other layer intact until complete removal is desired. The size, uniformity, roundness, and surface characteristics of the holes may be selectively controlled by the choice of etchant formulation, temperature, and emersion time. In addition, the use of ultrasonic agitation during the etching process has proved to be extremely valuable in keeping a proper amount of unspent etchant in the small holes formed in the substrate 10, thus insuring uniform etching and relatively perpendicular walls of the holes (to the surface of the substrate 10). The layers 12 and 12' are then removed, as seen in FIGURE 1(*e*), leaving the substrate 10 with the hole pattern 18 in a form suitable for use as the base upon which to plate the magnetic memory array.

In FIGURE 2(*a*), the substrate 10 and the holes therein are shown coated with a conductive layer 20, such as copper, nickel, or a magnetic alloy; if the substrate 10 is non-conductive (as previously assumed), the conductive layer 20 may be deposited, for example, by an electroless plating technique. Since, as state previously, it is desired that the magnetic properties of a plated magnetic material be independent of the surface structure of the substrate 10, it may be desirable to electroplate a second conductive surface on the substrate 10, since the surface characteristics of an electro-plated material may be more carefully controlled. Moreover, if the surface of the substrate 10 is sufficiently smooth, the magnetic material may be electrolessly deposited (or electro-plated if substrate 10 is conductive) directly thereon using, for example, a hypophosphite reduction of nickel and cobalt. In this embodiment, however, the substrate 10 and the conductive layer 20 are then electro-plated with a magnetic material 22, each as Perselloy (80 Ni-20 Fe), to produce the configuration shown in FIGURE 2(*b*). Ultrasonic agitation may be used during the electroplating of the magnetic material 22 on the conductive layer 20, since it has been experimentally found that the use thereof improves the uniformity of the magnetic material 22 in the hole pattern 18 and in the individual holes and assists in controlling the cell size of the individual grains of the magnetic material 22, the orientation of the magnetization vectors in the material 22, and the anisotropy of the magnetic material 22. Although the geometric configuration of the magnetic material 22 plated in the hole pattern 18 produces a circumferential easy direction of magnetization in each hole of the hole pattern 18 and thus naturally orients the magnetization vectors of the magnetic material 22, this natural magnetic orientation of the magnetic material 22 may be enhanced during the electroplating process by imposition of a rotating magnetic field (H), with the plane of rotation coinciding with the plane of the substrate 10.

Figure 3:
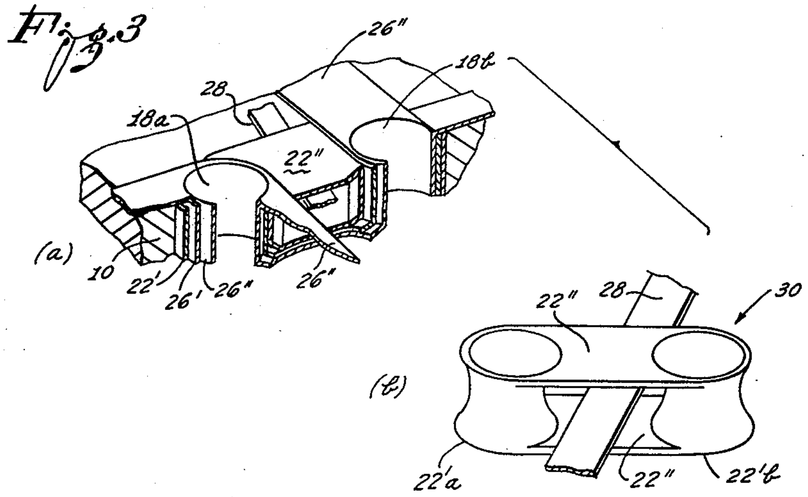
FIGURES 3(*a–b*) illustrate a non-destructive readout element and the plated circuitry customarily used in the invention.

Portions of the magnetic material 22 and the conductive layer 20 are then chemically etched from the surface of the substrate 10 using photo-resist techniques so that only the material in the hole pattern 18 remains, as shown in FIGURE 2 (*c*), to form a matrix of plated magnetic toroids. Although this technique is preferred, the magnetic material 22 may be selectively plated on the conductive layer 20, for example, by previously etching the desired pattern on the conductive layer 20 using photo-resist techniques and electro-plating the magnetic material 22 thereon. Moreover, although a matrix of plated magnetic toroids has been shown, the magnetic material 22 in the individual holes of the hole pattern 18 can be connected to the magnetic material 22 in any other hole or combination of holes by suitable masking techniques to form any desired configuration of connect, plated magnetic toroids. As illustrated in FIGURE 2(*d*), the substrate 10 and the magnetic material 22 are then coated with a layer of insulating material 24, and a desired pattern of metallic conductors 26 is laid down on top of the insulating material 24, across the surface of the substrate 10, and through the hole pattern 18. Although the insulating material 24 between the magnetic material 22 and the conductors 26 is desirable, for example, to prevent eddy currents in the magnetic material 22 (caused by current flowing therethrough), it is not essential for the operation of the invention. Moreover, as described more fully in relation to FIGURES 3(*a–b*), metallic conductors, such as conductors 26, may be formed before the magnetic material is deposited.

Figure 4:
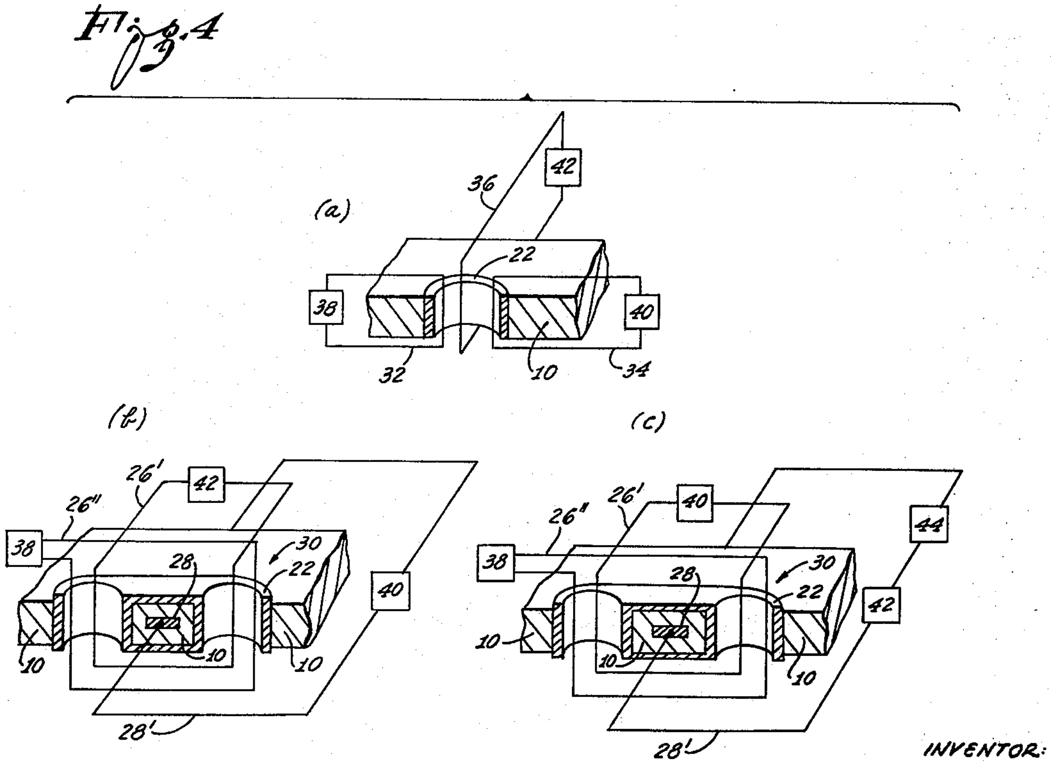
FIGURES 4(*a–c*) illustrate the invention incorporated in simplified memory circuitry.

FIGURE 4(*a*) illustrates a plated magnetic toroid incorporated in a simplified memory circuit and operating in a destructive readout mode of operation (DRO). Substrate 10 is shown with magnetic material 22 plated on the walls of a hole therein to form the plated magnetic toroid; leads 32, 34, and 36 are threaded therethrough and are connected to write driver 38, interrogate driver 40, and a sensing circuit 42 respectively. In the DRO mode of operation, write driver 38 generates a circumferential magnetic field which orients the magnetization vectors of the plated magnetic toroid clockwise or counterclockwise; interrogate driver 40 generates a circumferential magnetic field which reverses the orientation of any magnetization vectors antiparallel thereto; and sensing circuit 42 responds to any changes in the orientation of the magnetization vectors in the plated magnetic toroid. All of the driving and sensing elements are standard items commonly used in the art, while, in the practice of the invention, the leads would be plated on the substrate 10 and through the holes, as previously described.

Although the above matrix of plated magnetic holes is commonly used in such a destructive readout mode of operation (DRO), for a great many applications a nondestructive readout mode of operation (NDRO) is preferred. The plating techniques described in conjunction with FIGURES 2(*a–d*) can be adapted to fabricate the structure shown in FIGURES 3(*a–b*). A metallic strip 28 is placed between holes 18(*a*) and 18(*b*); the metallic strip 28 may be plated on the substrate 10, or it may be etched from one of the metallic layers 12 and 12′, or it may be made integral with the substrate 10 during its fabrication. The magnetic material 22 is then plated through the holes 18(*a*) and 18(*b*) and across the substrate 10 (and over the metallic strip 28) to join corresponding edges of the plated magnetic toroids 22(*a*) and 22(*b*) to form the NDRO element 30 shown in simplified form in FIGURE 3(*b*). It should be noted that such an element may also be fabricated by other techniques, such as molding, or compressing and sintering a powder. In addition, the metallic strip 28 may be insulated from the magnetic material 22 by a layer of insulating material, such as layer 24 in FIGURE 2(*d*), but such insulation is not necessary for the operation of the invention; if, however, substrate 10 is conductive, then metalic strip 28 must be insulated from the substrate 10 itself. Although the rotating magnetic field used during the plating of the magnetic material 22 enhances the magnetic orientation of the plated magnetic toroids (designated as 22′) in the circumferenetial direction, the connecting magnetic materal (designated as 22″) remains isotropic. The remaining metallic leads 26′ and 26″ are then plated over the substrate 10 and through the hole 18*a*, 18*b*, as previously described, the metallic leads 26 and 26′ being electrically insulated from each other by a layer of insulating material (not shown).

Information is written into the NDRO element by 30 by a pulse applied to lead 26″ (by write driver 38) which orients the magnetization vectors of the plated magnetic toroids 22′*a* and 22′*b* along one of the two circumferential easy directions of magnetization. It should be noted that a closed flux path, orthogonal to the closed flux paths of the plated magnetic toroids 22′*a* and 22′*b*, is formed by the isotropic magnetic material 22″ and the anisotropic magnetic material in the edges of the plated magnetic toroids 22′*a* and 22′*b* nearest the center of the NDRO element 30. Because this formed closed flux path contains part of the anisotropic magnetic material of the plated magnetic toroids 22′*a* and 22′*b*, the metallic strip 28, surrounded by the formed closed flux path, is capable when pulsed of reorienting a portion of the magnetization vectors of the plated magnetic toroids 22′*a* and 22′*b*; that is, a portion of the magnetization vectors circumferentially directed in the plated magnetic toroids 22′*a* and 22′*b* will be rotated into the hard direction of magnetization of the plated magnetic toroids 22′*a* and 22′*b* along the formed closed flux path described above. If an interrogate signal is then applied to metallic strip 28 (by interrogate driver 40), the magnetization vectors in the region common to the plated magnetic toroids 22′*a* and 22′*b* and the formed closed flux path become reoriented, causing a decrease in the magnetic flux linked by metallic lead 26′. As a result, an output pulse is obtained (on metallic lead 26′) with its polarity dependent on the initial magnetic orientation of the plated magnetic toroids 22′*a* and 22′*b*. The magnetic anisotropy of the plated magnetic toroids 22′*a* and 22′*b* reorients the magnetization vectors thereof to their initial state when the interrogate pulse is removed. The information content of the NDRO element 30 is thus represented by a bipolar output whose polarity, as before, depends on the initial magnetic orientation of the plated magnetic toroids 22′*a* and 22′*b*.

FIGURE 4(*b*) illustrates the NDRO element 30, formed from magnetic material 22 plated on substrate 10, integrated in a simplified memory circuit. Lead 26″ is connected to write driver 38, metallic strip 28 is connected through lead 28′ to interrogated driver 40, and lead 26′ is connected to sensing circuit 42′ All of these elements operate in the mode herein described to produce a bipolar output of opposite polarity. It should be noted that since the closed flux paths of the plated magnetic toroids 22′*a* and 22′*b*, which lie in the plane of the substrate 10, are joined only by the isotropic connecting magnetic material 22″, the toroids 22′*a* and 22′*b* act substantially independent of one another as far as magnetic coupling effects are concerned. As such, the circuity in FIGURE 4(*b*) can be modified to store *two* bits of information by the addition of a second write drive and a second sensing circuit; each one of the two write drivers and sensing circuits coacts with a corresponding one of toroids 22′*a* and 22′*b* to write and sense information. This modified circuit has the additional advantage that *both* bits of information can be simultaneously read-out by the application of a single interrogate signal by interrogate driver 40.

While readout pulses of opposite polarity, as described above, are satisfactory for many type of logic circuitry, it is often desirable to have an output in a NDRO mode of operation which has a value of 0 or 1 depending on whether the magnetic field of the interrogate pulse is parallel or antiparallel to the magnetic orientation of the memory element. FIGURE 4(*c*) illustrates the NDRO element, described in conjunction with FIGURES 3(*a–b*), coupled to memory circuitry adapted for such a mode of operation. Metallic lead 26'' is connected to write driver 38, metallic lead 26' is connected to interrogate driver 40, and metallic strip 28 is connected through lead 28' to sensing circuit 42 and bias source 44. It should be noted that the metallic strip 23, which now has a small D.C. bias applied to it by bias source 44, is used for sensing the magnetic orientation of the plated magnetic toroids **22'*a* and 22'*b*. If the magnetic field of the metallic lead 26', caused by interrogate driver 40, is antiparallel to the direction of magnetization of the plated magnetic toroids 22'*a* and 22'*b*, the magnetization vectors in the edges of of the plated magnetic toroids 22'*a* and 22'*b* nearest the center of the NDRO element 30 can be easily rotated since the various forces constraining the magnetization vectors to be along the easy direction of magnetization are largely reduced. The magnetic field of the DC bias causes such uncoupled magnetization vectors to rotate in the direction of such magnetic field and thus causes a positive current to be generated in the metallic strip 28. Upon removal of the interrogate pulse, the magnetization vectors in the edges of the plated magnetic toroids 22'*a* and 22'*b* return to their initial state because of the magnetic anisotropy of the plated magnetic torids 22'*a* and 22'*b*. Generally speaking then, if the magnetic field of the interrogate pulse is of a polarity opposite to the magnetic orientation of the plated magnetic toroids 22'*a* and 22'*b* representing the information written in the NDRO element 30, a bipolar output is obtained. If, however, the magnetic field of the interrogate pulse is parallel to the magnetic orientation of the plated magnetic toroids 22'*a* and 22'*b*, the magnetization vectors in the aforementioned edges rotate only a small amount into the direction of magnetization of the plated magnetic toroids 22'*a* and 22'*b***, and an output is detected which is a factor of 5 to 10 times less in magnitude than the above-mentioned bipolar output. This mode of operation thus yields the desired output values of 0 or 1 depending on whether the magnetic field of the interrogate pulse is parallel or antiparallel to the magnetic orientation of the memory element.

Having thus described the invention, it is obvious that numerous modifications and departures may be made by those skilled in the art; thus, the invention is to be construed as limited only by the spirit and scope of the appended claims.

What is claimed is:

1. A magnetic memory element comprising:

a substrate having at least first and second spaced-apart apertures therethrough;

a layer of magnetizable material affixed to the walls of said first and second apertures to form first and second circumferential closed flux paths, respectively;

a layer of magnetic material joining the corresponding edges of adjacent portions of said first and second flux paths to form a third closed flux path angularly oriented to said first and second flux paths;

means, coupled to at least one of said first and second flux paths, for writing information into said memory element, said writing means including means for setting said least one flux path into a first or second circumferential remanent magnetic state;

interrogation means, coupled to at least one of said first and second flux paths, for temporarily applying a magnetic field along a selected one of first and second circumferential directions;

bias means, coupled to said third flux path, for applying a magnetic field thereto along a third direction angularly oriented to said first and second circumferential directions; and sensing means, coupled to said third flux path for sensing the change in flux in said third direction during the application of said interrogation field.

2. The magnetic memory element of claim 1 wherein said first and second flux paths have substantially parallel axes, and said third flux path is substantially orthogonal to said first and second flux paths.

3. The magnetic memory element of claim 1 wherein said first and second flux paths are formed of anisotropic magnetic material having the easy direction of magnetization along said first and second circumferential directions.

4. The magnetic memory element of claim 3 wherein said layer of magnetic material joining said first and second flux paths comprises isotropic magnetic material.

5. The magnetic memory element of claim 4 wherein said third flux path has portions thereof common to said first and second flux paths, and said third direction is substantially parallel to the hard direction of magnetization of said common portions.

6. The magnetic memory element of claim 1 wherein said sensing means includes means for generating a first bipolar output signal when said interrogation field is antiparallel to the circumferential remanent magnetic state established by said writing means, and a second bipolar output signal when said interrogation field is parallel to the circumferential remanent magnetic state established by said writing means; said first signal being of substantially greater amplitude than said second signal.

7. The magnetic memory element of claim 1 wherein said writing means and said interrogation means are coupled to said first and second flux paths.

8. The magnetic memory element of claim 1 wherein said interrogation means and said writing means are each coupled to at least one of said first and second flux paths by one or more layers of conductive material plated on said substrate adjacent said layer of magnetic material, and said sensing and bias means are coupled to said third flux path by a printed conductive lead formed on said substrate through said third flux path.

9. The magnetic memory element of claim 1 wherein said apertures form hollow cylinder shaped structures, and a layer of glassy material is affixed to the walls of said first and second apertures beneath said layer of magnetizable material.

References Cited

UNITED STATES PATENTS

| | | | |
|---|---|---|---|
| 3,000,004 | 9/1961 | Weller | 340—174 |
| 3,060,321 | 10/1962 | Woods | 307—88 |
| 3,061,820 | 10/1962 | Wanlass | 340—174 |
| 3,305,845 | 2/1967 | Grace et al. | 340—174 |

STANLEY M. URYNOWICZ, Jr., Primary Examiner

U.S. Cl. X.R.

29—604